Aug. 3, 1954 J. A. LAUCK 2,685,342
HYDRAULIC STEERING MECHANISM
Filed Dec. 15, 1951
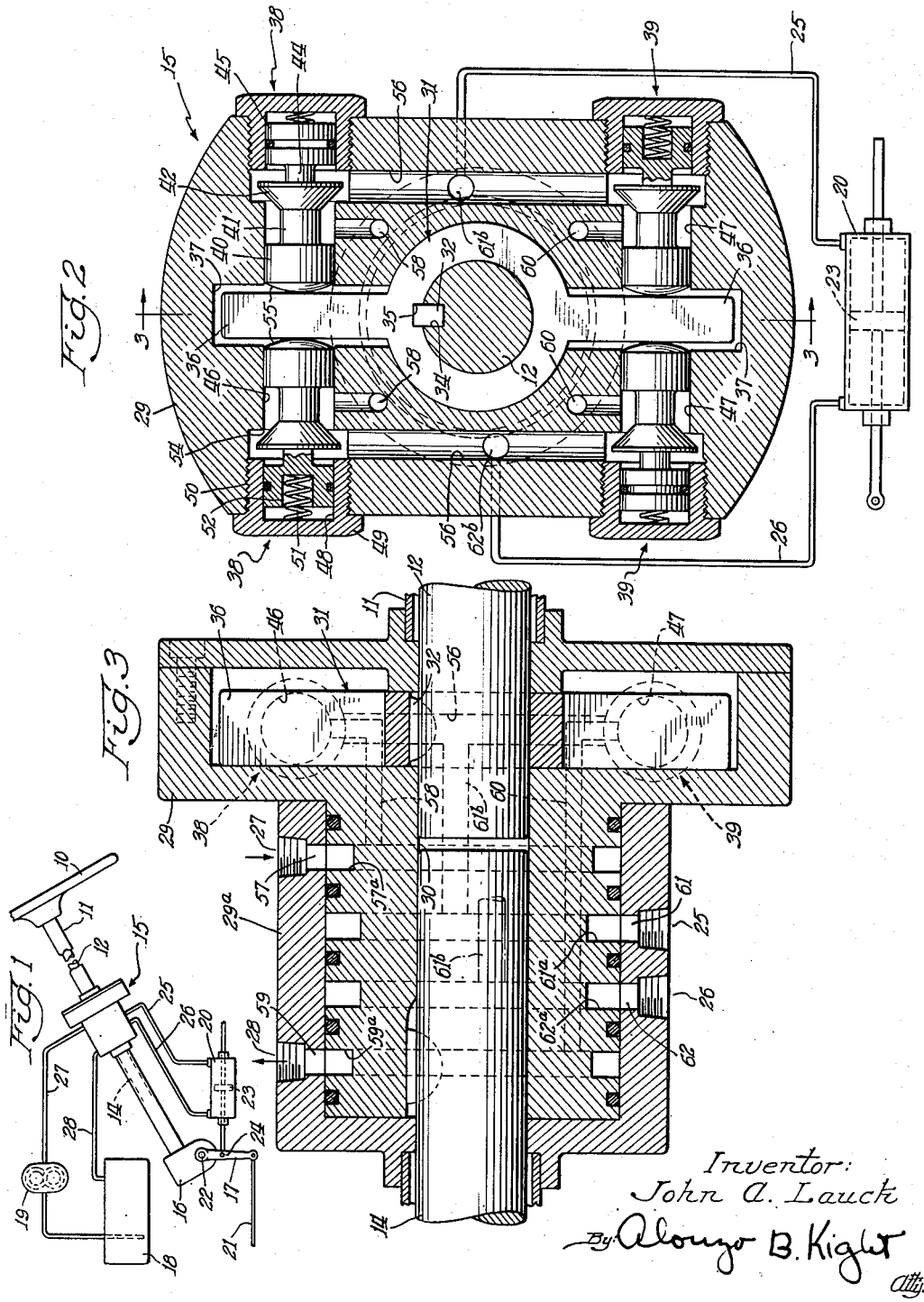
Inventor:
John A. Lauck
By Alonzo B. Kight
Atty.

Patented Aug. 3, 1954

2,685,342

UNITED STATES PATENT OFFICE 2,685,342

HYDRAULIC STEERING MECHANISM

John A. Lauck, Shaker Heights, Ohio, assignor to Borg-Warner Corporation, Chicago, Ill., a corporation of Illinois Application December 15, 1951, Serial No. 261,876

6 Claims. (Cl. 180—79.2)

This invention relates to power steering mechanism for steering the dirigible wheels of a vehicle. More particularly, the invention relates to a simplified and improved fluid pressure boosted steering mechanism which can be easily installed in a vehicle embodying conventional mechanical steering.

Most power or power boost steering mechanisms which are produced today require the provision of a different gear box at the end of the steering column from that utilized in conventional steering arrangements. In addition, such mechanisms of the prior art ordinarily require some modifications to the steering column plus the addition of complicated valving means and power steering linkages. As a result, most power steering devices of the prior art are expensive and difficult to incorporate in a vehicle. Consequently, there is a great demand in the highly competitive automotive field for an inexpensive power steering device which is durable and reliable and which can be incorporated in conventional mechanical steering arrangements with a minimum of change.

The steering mechanism of the present invention is intended to meet the demand for an improved and simplified power steering device which can be easily installed in vehicles embodying conventional mechanical steering arrangements. The mechanism of the present invention can be installed by separating a conventional steering shaft into two parts and providing a simplified coupling therebetween. The coupling includes improved valving means for controlling the admission of pressurized fluid to two sides of a reciprocable fluid piston which is connected to the pitman arm of the conventional steering device. The arrangement provides for graduated steering force to be applied to the dirigible wheels in response to the manual effort imposed on the vehicle steering wheel. The resultant mechanism provides power boosted steering while still incorporating the required amount of "feel," and in addition, conventional mechanical steering is provided for in the event of failure of the power boost means.

It is, therefore, an object of the present invention to provide improved and simplified mechanism for power steering of the dirigible wheels of a vehicle.

Another object of the invention is to provide an improved differential fluid pressure type of power steering device which functions on torque reaction and still has "fail safe" characteristics.

A further object of the invention is to provide a power steering mechanism having improved control characteristics and providing for substantially conventional mechanical steering characteristics in the event of failure of the power mechanism.

An additional object of the invention is to provide a differential fluid pressure type of power steering mechanism including improved and simplified valving means incorporated in a coupling for connecting the two portions of a split steering shaft.

Still another object of the present invention is to provide a simple power steering mechanism which can be easily installed in a conventional mechanical steering arrangement by forming the steering shaft in two portions and providing a simplified coupling therebetween and by including means for providing fluid under a pressure other than atmospheric and a pressure actuated fluid motor.

A specific object of the invention is to provide a hydraulic steering mechanism which incorporates a simplified mechanical coupling between two portions of a steering shaft with the coupling including control valving means which incorporate "feel" into the mechanism and provide for power-boosted steering effort in proportion to the manual steering effort applied, said mechanism having "fail safe" characteristics.

Other objects, features and advantages of the present invention will be apparent from the following detailed description of one embodiment, by way of preferred example only, taken in conjunction with the accompanying drawings, in which:

Fig. 1 is a fragmentary, schematic view of a vehicle steering mechanism including power boost means according to the present invention;

Fig. 2 is an enlarged, schematic view, partly in section, of the coupling between the two portions of the steering shaft including the control valves and showing the connection with the fluid boost motor; and Fig. 3 is a sectional view taken substantially along line 3—3 of Fig. 2.

In Fig. 1 is illustrated mechanism for steering the dirigible wheels of a vehicle (not shown) and including a steering wheel 10, a steering column 11, and an upper, manually rotatable, steering shaft 12 to which the steering wheel is secured. The mechanism also includes a lower, rotatable, steering shaft 14, axially aligned with the shaft 12, a coupling 15 between the shafts, a steering gear box 16 at the lower end of the shaft 14 for translating rotary motion of the shaft 14 into pivotal movement of a pitman arm 17, a fluid reservoir 18, a fluid pump 19 and a fluid servo-motor or power boost cylinder 20. The outer end portion of the pitman arm 17 is pivotally secured to a drag link 21 or the like, which connects with a steering linkage arrangement (not shown) for steering the dirigible wheels (not shown) of the vehicle.

In the operation of the mechanism of this arrangement manual steering effort, which is applied to the shaft 12 through the steering wheel 10, is multiplied by means of the boost cylinder 20 through pressure supplied by the pump 19, which is controlled by control mechanism included in the coupling 15 to be described.

The steering gear box 16 may be of any suitable design wherein rotary motion of the lower shaft 14 is translated into pivotal movement of a steering box stub shaft 22 which is keyed or otherwise fixedly secured to the inner end of the pitman arm 17 for imparting oscillatory movement of the drag link 21.

The boost cylinder 20 includes a piston 23 which may be pivotally secured at 24 to the pitman arm 17 for pivoting the same about the axis of the stub shaft 22 in response to differential pressure applied to the piston through fluid conduits 25 and 26 communicating, respectively, with the opposite sides of the piston. The fluid in the conduits 25 and 26 is supplied from the pump 19 through a fluid conduit 27 which delivers fluid to the coupling 15. A by-pass or bleed fluid conduit 28 connects the coupling 15 with the reservoir 18. It will be understood that the reservoir 18 may comprise the engine oil sump of the vehicle, and the pump 19 may comprise the engine oil pump or a separate auxiliary pump.

The coupling 15 is shown in detail in Figs. 2 and 3. As shown in these figures, the coupling 15 includes a valve housing 29 which is fixedly secured to the lower shaft 14 and journalled in a stationary support sleeve 29a. The housing 29 has a central axial bore 30 for rotatably receiving the lower end portion of the shaft 12. A torque lug or coupling member 31 is non-rotatably secured to the shaft 12 by a key 32 disposed in a slot 34 in the shaft 12 and a slot 35 in the coupling member 31. The coupling member 31 is provided with a pair of integral radially oppositely extending arms or ears 36, 36 which are disposed in normally spaced relation in a pair of generally conforming slots 37, 37 provided in the housing 29 and communicating with the bore 30. As can be seen, there is a mechanical linkage between the shafts 12 and 14 in that rotation of the shaft 12 will cause rotation of the coupling member 31 and consequent rotation of the shaft 14 through engagement of the ears 36 with the defining walls of slots 37. It will also be seen that, due to the normally spaced relation between the ears 36 and the defining walls of the slots 37, a limited lost motion interval is provided between the shaft 12 and the shaft 14 when the mechanical linkage of the coupling member 31 is utilized for steering.

Means are provided for controlling and directing the fluid pressure supplied to the coupling 15 through the pressure conduit 27 in order to obtain pressure boosted power steering through the boost cylinder 20. Herein such means comprise a pair of pressure control valves 38, 38 for controlling the fluid pressure from the conduit 27 and a pair of bleed control valves 39, 39 for controlling the bleeding of pressure from the coupling 15 back to the reservoir 18 through the bleed conduit 28. The valves 38 and 39 may be identical and each may comprise an enlarged head portion 40, a reduced diameter stem portion 41, a frusto-conical valve seat portion 42, a reduced diameter stem 44 and a skirt portion 45. The head portions 40 of the valves 38 are slidably disposed in respective conforming bores 46 extending coaxially outwardly from one of the slots 37, and the head portions 40 of the valves 39 are slidably disposed in conforming relation in respective conforming bores 47 extending coaxially outwardly from the other of the slots 37. The skirt portions 45 of the valves 38 and 39 are slidably disposed in conforming bores 48 formed in respective closure plugs or caps 49 which are threadably inserted into threaded bores 50 formed in the housing 29 coaxially outwardly of the bores 46 and 47. Respective compression springs 51 are disposed in reduced diameter recesses 52 formed in the ends of the skirt portions 45. The springs 51 act between the skirt portions and the plugs 49 to urge the respective valves 38 and 39 inwardly. The frusto-conical seat portions 42, are adapted for seating against valve seats 54 provided at the outer ends of the bores 46 and 47. It will be noted that the valves 38 and 39 are of the pressure balanced type so that there will be no net fluid pressure bias on the valves whether in the opened or closed positions. With the coupling member 31 in the neutral position as shown in Fig. 2 the valves 38 and 39 are held open by means of rounded ends 55 formed on the valve heads 40 which abut the ears 36.

Communication is afforded between respective pairs of bores 46 and 47 by means of interconnecting passages 56, 56 when the corresponding pairs of valves are open. Fluid under pressure from the conduit 27 is supplied to the bores 46 through an inlet passage 57 in the stationary support sleeve 29a, an annular groove 57a in the valve housing 29 and respective branch passages 58, 58. Communication between the bleed conduit 28 and the bores 47 is provided through a bleed passage 59 in the stationary support sleeve 29a, an annular groove 59a in the valve housing 29 and respective branch passages 60, 60.

One side of the boost cylinder piston 23 is referenced through the conduit 25, a port 61 in the stationary sleeve 29a, an annular groove 61a in the valve housing 29 and a passage 61b to one of the interconnect passages 56, and the other side of the piston 23 is referenced through the conduit 26, a port 62 in the stationary sleeve 29a, an annular groove 62a in the valve housing 29 and a passage 62b to the other interconnect passage 56.

As will be seen, when the member 31 is in the neutral position as shown in Fig. 2, all of the valves 38 and 39 are held open equally so that the fluid supplied through the passages 58 passes by the open valves 38, through the interconnect passages 56, past the open valves 39, into the bleed passages 60 and thence back to the reservoir 18. Since the pressure drops through the respective valves 38 and 39 are equal, the pressures in the passages 56 are equal and no power boosted movement of the pitman arm 17 will occur.

In operation, steering effort applied to the steering wheel 10 is transmitted through the upper steering shaft 12 to the coupling member 31 to cause consequent rotation of the member 31 about the axis of the shaft 12. If the power boost system is inoperative for any reason, torque transmitted to the coupling member 31 will be imparted to the lower shaft 14 through mechanical engagement with the valve housing 29 after the member 31 has been rotated through the limited lost motion interval until opposite sides of the lugs or ears 36 abut the respective defining walls of the slots 37. Thus, the steering mechanism of the present invention is provided with "fail safe" characteristics and a substantially conventional mechanical steering linkage is provided so that the dirigible wheels of the vehicle may be readily steered when the pump 19 is inoperative for any reason.

In operation with the power boost system functioning, rotary motion supplied to the coupling member 31 urges one of the valves 38 and the diagonally opposite valve 39 toward further open positions against the bias of the springs 51. At the same time, the other valve springs 51 urge the other pair of diagonally opposite valves 38 and 39 toward closed positions. As the diagonally opposite pair of valves 38 and 39 are respectively moved toward further opened and closed positions when the coupling member 21 is rotated in the lost motion interval, the pressure drops through the closing valves will be increased and the pressure drops through the further opening valves will be decreased. As a result, the fluid pressure in one of the interconnect passages 56 will be increased while the fluid pressure in the other interconnect passage 56 will be decreased. Hence, the pressure on one side of the piston 23 will be increased and the pressure on the other side of the piston 23 will be decreased. This will result in movement of the piston 23 in one direction to give a power boosted movement of the pitman arm 17 and will result in steering movement of the dirigible wheels in one direction. If the steering wheel 10 is turned in the opposite direction it will be readily seen that the boost cylinder piston 23 will also be urged in the opposite direction to steer the dirigible wheels correspondingly.

It should be noted that the power boost force applied by the piston 23 varies as the steering effort applied to the steering wheel 10 since increased steering effort will result in increased movement of the control valves which provides an increased pressure differential on the piston 23. Also, the speed of movement of the boost cylinder piston 23 will depend upon the rate of rotation of the steering wheel 10 up to the maximum rate of power boosted rotation which will occur when the coupling member 31 is rotated so fast that the ears 36 abut the corresponding sides of the slot 37 to impart maximum movement to the valves 38 and 39.

In conclusion, the present invention provides a very much simplified power steering mechanism which can be installed in a conventional mechanical steering linkage with a minimum of modification. The only modifications necessary in such an installation are the separation of the steering shaft into two parts, the provision of the simplified coupling between the two parts, and the provision of a pump and a power boost cylinder including the pressure conduits therefor. It is not necessary to revise the conventional mechanical steering linkage arrangement or to modify the steering gear box. Very simple and inexpensive provision can be made for alternately installing power steering or mechanical steering in vehicles in the same model by providing for alternate installation of the simplified coupling of the present invention or an ordinary mechanical coupling in its place.

The coupling of this invention is of an improved balanced valve type which is actuated through movement of the steering shaft itself. A certain amount of "feel" is built in in the form of spring resistance by the valve springs. The valving arrangement in the coupling is such as to give coordination between movement of the steering wheel and the steering of the dirigible wheels both as to rate of movement and as to steering effort.

It will be understood that modifications and variations may be effected without departing from the scope of the novel concepts of the present invention. For example, the power boost mechanism may be utilized for actuating many types of movable elements other than vehicle dirigible wheels.

I claim:

1. Mechanism for steering the dirigible wheels of a vehicle comprising a manually rotatable steering shaft, a second rotatable steering shaft axially aligned with said manually rotatable shaft, a coupling member secured to one of said shafts and associated with the other shaft to rotate the same in response to rotation of said one shaft, said coupling member providing a limited lost motion interval between the shafts, means including a pitman arm associated with said second shaft for steering the dirigible wheels in response to rotation of the second shaft, a fluid motor having a reciprocable piston connected to said pitman arm for moving the same, a fluid source connected to said motor for providing fluid pressure other than atmospheric, fluid pressure control valves associated with said other shaft and having portions abutting said coupling member for actuation thereby in said lost motion interval, said coupling member normally holding said valves open, means on said valves for accomplishing differential opening and closing of said valves by movement of said coupling member, whereby movement of said manually rotatable shaft in either direction effects differential opening of some and closing of others of said valves to provide a net differential pressure bias on said fluid actuated piston to effect power steering of the dirigible wheels, said net differential pressure bias on said fluid actuated piston being controlled by said valves both to and from said piston, said coupling member also providing for manual steering of said dirigible wheels in the event of failure of said power boost means.

2. Mechanism for steering the dirigible wheels of a vehicle comprising a manually rotatable steering shaft, a second rotatable steering shaft axially aligned with said manually rotatable shaft, a coupling member secured to one of said shafts and associated with the other shaft to rotate the same in response to rotation of said one shaft, said coupling member providing a limited lost motion interval between the shafts, means including a pitman arm associated with said second shaft for steering the dirigible wheels in response to rotation of the second shaft, a fluid motor having a reciprocable piston connected to said pitman arm for moving the same, a source of fluid, four fluid control valves associated with said other shaft and having portions abutting said control member, said coupling member normally holding said valves open, fluid conduit means passing said fluid through said valves when opened both to said fluid motor and back to said fluid source, said valves having surface means thereon cooperating with said fluid conduit means to provide variable area openings between fully opened and fully closed position, whereby movement of said manually rotatable shafts in one direction in said lost motion interval causes movement of two of said valves toward closed position to provide an increased fluid pressure dependent upon the differential area opening provided by said valve means on one side of said piston to steer said dirigible wheel in one direction by control of the differential pressure to and from said reciprocable piston and whereby movement of said manually rotatable shaft in the other direction in said lost motion interval causes movement of said other two valves toward closed position to provide an increased fluid pressure dependent upon the differential area opening provided by said valve means on the other side of said piston to steer said dirigible wheels in the other direction by control of the differential pressure to and from said reciprocable piston, said coupling member providing for manual steering of said dirigible wheels in the event of failure of said power boost means.

3. In mechanism for steering the dirigible wheels of a vehicle and including a manually rotatable steering shaft, means associated with the shaft for steering the dirigible wheels in response to rotation of the shaft, said means comprising a coupling member permitting a limited lost motion interval of the shaft and completing a mechanical steering connection between the shaft and the dirigible wheels beyond said lost motion interval, a fluid motor having a reciprocable piston connected to said means for steering the dirigible wheels in response to movement of the piston, two pressure control valves, two bleed control valves, said coupling member normally holding said valves open, a source for supplying fluid under pressure other than atmospheric, conduit means referencing fluid from said source to said pressure control valves and through the same when open to the opposite sides of said fluid motor piston, conduit means referencing the fluid downstream of said pressure control valves through said bleed control valves when open to atmospheric pressure, means on each of said valves which cooperates with said conduit means to provide variable differential area openings between fully opened and fully closed positions of said valves, whereby movement of said shaft in one direction in said lost motion interval acts through said coupling member to cause movement of one of said pressure control valves and one of said bleed control valves toward closed position to cause a net differential pressure bias on said piston to steer the dirigible wheels in one direction and whereby movement of said shaft in the other direction in said lost motion interval acts through said coupling member to cause movement of the other of said pressure control valves and the other of said bleed control valves toward closed position to cause a reverse net differential pressure bias on said piston to steer said dirigible wheels in the other direction, said net differential pressure bias being accomplished by said valves which control the flow of differential pressure to and from the opposite sides of said piston.

4. In mechanism for steering the dirigible wheels of a vehicle and including a manually rotatable steering shaft, means associated with the shaft for steering the dirigible wheels in response to rotation of the shaft, said means comprising a coupling member secured to said shaft and having a pair of radially outwardly extending ears, an element having slots therein receiving said ears in normally spaced relation to provide a limited lost motion interval between the coupling member and the element, said coupling member and said element completing a mechanical steering connection between said shafts and said dirigible wheel beyond said lost motion interval, a fluid motor having a reciprocable piston connected to said means for steering the dirigible wheel in response to movement of the piston, two pressure control valves including springs biasing the valves toward closed position, said pressure control valves having tapered metering surfaces thereon, two bleed control valves including springs biasing the valves toward closed position, said bleed control valves having tapered metering surfaces thereon, said coupling member normally holding said valves open, a source of fluid under pressure, conduit means referencing fluid from said source to said pressure control valves and through the same when opened to the opposite sides of said fluid motor piston, conduit means referencing the fluid downstream of said pressure control valves through said bleed control valves when opened to atmospheric pressure, whereby movement of said shaft in one direction in said lost motion interval acts through said coupling member to move one of said pressure control valves and one of said bleed control valves toward further open positions to thus proportionately increase the flow area therethrough and said springs act to move the other valves toward closed positions to thus proportionately decrease the flow area therethrough to increase the pressure on one side of the piston to steer said dirigible wheels in one direction, and whereby movement of said shaft in the other direction in said lost motion interval acts through said coupling member to move the other of said pressure control valves and the other of said bleed control valves toward further open positions to thus proportionately increase the flow area therethrough and said springs act to move the remaining valves toward closed positions to thus proportionately decrease the flow area therethrough to increase the pressure on the other side of said piston to steer said dirigible wheels in the other direction, said proportional increase or decrease of flow area through said valves being accomplished by said tapered metering surfaces.

5. In mechanism for steering the dirigible wheels of a vehicle and including a manually rotatable steering shaft, and a second rotatable shaft axially aligned with said manually rotatable shaft, means associated with the shafts for steering the dirigible wheels in response to rotation of the manually rotatable shaft, said means comprising mechanism associated with said second shaft for steering the dirigible wheels in response to rotation of the second shaft, a coupling member secured to said manually rotatable shaft and having a pair of radially oppositely extending ears, an element secured to said second shaft and having slots therein receiving said ears in normally spaced relation to provide a limited lost motion interval between the coupling member and the element, said coupling member and said element completing a mechanical steering connection between said shafts beyond said lost motion interval, a fluid motor having a reciprocable piston connected to said last-mentioned mechanism for steering the dirigible wheels in response to movement of the piston, two pressure control valves having tapered metering surfaces thereon and including springs biasing the valves toward closed positions, two bleed control valves having tapered metering surfaces thereon and including springs biasing the valves toward closed positions, said pressure control valves having portions abutting one of said control member ears and said bleed control valves having portions abutting the other of said control member ears whereby said coupling member ears normally hold said valves open, said pressure and bleed control valves having surfaces thereon in addition to said tapered metering surfaces, all of which cooperate to balance the valves against fluid pressure bias in any position, a source of fluid, a pump adapted to draw fluid from said source and to pressurize the fluid, conduit means referencing fluid from said pump to said pressure control valves and through the same when open to the opposite sides of said fluid motor piston, conduit means referencing the fluid downstream of said pressure control valves through said bleed control valves when opened back to said source, whereby movement of said manually rotatable shaft in one direction in said lost motion interval acts through said coupling member ears to move one of said pressure control valves and one of said bleed control valves further open with said springs moving said other valves toward closed positions to thus increase and decrease respectively the differential area openings of said valves to provide an increased differential fluid pressure on one side of said piston to steer said dirigible wheels in one direction and whereby movement of said manually rotatable shaft in the other direction in said lost motion interval acts through said coupling member ears to move the other of said pressure control valves and the other of said bleed control valves further open with said springs moving the remaining valves toward closed positions to thus increase and decrease respectively the differential area openings of said valves to provide an increase differential fluid pressure on the other side of said piston to steer said dirigible wheels in the other direction, said increase or decrease of differential area opening being accomplished by said tapered metering surfaces on said valves.

6. Valving mechanism for controlling fluid pressure comprising a valve housing having a fluid inlet port, a fluid outlet port and two controlled fluid pressure ports, a pair of pressure control valves having tapered metering surfaces thereon and arranged in parallel in said housing for controlling fluid flow into said housing through said inlet port and including valve springs biasing the valves toward closed position, a pair of bleed control valves having tapered metering surfaces thereon and arranged in parallel in said housing for controlling fluid flow out of said housing through said outlet port and including valve springs biasing the valves toward closed position, said pressure and bleed control valves having pressure balance surfaces thereon in addition to said tapered metering surfaces, all of which cooperate to balance the valves against fluid pressure bias when in any position, said housing having a pair of fluid interconnect passages connected to the respective controlled pressure ports and interconnecting respective pairs of pressure control and bleed control valves, and a control member associated with said valves and having a neutral position in which the pressure control valves and the bleed control valves are held open respectively equally, said control member being arranged so that movement thereof in one direction moves one pressure control valve and the unconnected bleed control valve toward further open positions while allowing said springs to move the other valves toward closed positions thereby proportionately increasing and decreasing respectively the flow area through said valves and so that movement of the control means in the other direction reverses the movements of the valves, whereby the fluid pressures at the controlled pressure ports vary in accordance with the difference between the effective open areas through the pressure control valves, said difference in said effective open areas being accomplished by the relative position of said metering surfaces through movement of said valve.

References Cited in the file of this patent

UNITED STATES PATENTS

| Number | Name | Date |
| --- | --- | --- |
| 1,144,552 | Lardner et al. | June 29, 1915 |
| 1,719,875 | Cooper | July 9, 1929 |
| 1,907,211 | Moffet | May 2, 1933 |
| 1,910,600 | Fitch | May 23, 1933 |
| 2,028,451 | Hodge et al. | Jan. 21, 1936 |
| 2,293,555 | Mercier | Aug. 18, 1942 |
| 2,554,843 | Staude | May 29, 1951 |